(12) United States Patent
Alamayreh et al.

(10) Patent No.: US 9,178,681 B2
(45) Date of Patent: Nov. 3, 2015

(54) METHOD OF SEPARATING SOURCES IN A MULTISOURCE SYSTEM

(75) Inventors: Ahmad Alamayreh, Amman (JO); Jérôme Le Masson, Mordelles (FR)

(73) Assignee: FRANCE TELECOM, Paris (FR)

( * ) Notice: Subject to any disclaimer, the term of this patent is extended or adjusted under 35 U.S.C. 154(b) by 776 days.

(21) Appl. No.: 12/669,899

(22) PCT Filed: Jul. 18, 2008

(86) PCT No.: PCT/FR2008/051362
§ 371 (c)(1),
(2), (4) Date: Jan. 20, 2010

(87) PCT Pub. No.: WO2009/016306
PCT Pub. Date: Feb. 5, 2009

(65) Prior Publication Data
US 2010/0208736 A1  Aug. 19, 2010

(30) Foreign Application Priority Data
Jul. 20, 2007  (FR) ...................................... 07 56661

(51) Int. Cl.
*H04L 5/02* (2006.01)
*H04L 27/26* (2006.01)
(52) U.S. Cl.
CPC ............ *H04L 5/023* (2013.01); *H04L 27/2605* (2013.01)
(58) Field of Classification Search
CPC .... H04L 27/2605; H04L 5/023; H04L 49/256
USPC .......................................... 370/208; 375/145
See application file for complete search history.

(56) References Cited

U.S. PATENT DOCUMENTS 7,194,019 B2 * 3/2007 Dowla et al. .................. 375/147
7,656,850 B2 * 2/2010 Lindoff et al. ................ 370/338
(Continued)

FOREIGN PATENT DOCUMENTS

EP  1124348 A2  8/2001
WO  2007042424 A1  4/2007

OTHER PUBLICATIONS

Written Opinion dated Dec. 10, 2008 for corresponding International Application No. PCT/FR2008/051362, filed Jul. 18, 2008.
International Search Report and Written Opinion dated Dec. 19, 2008 for corresponding International Application No. PCT/FR2008/051362 filed Jul. 18, 2008.
(Continued)

*Primary Examiner* — Alpus H Hsu
*Assistant Examiner* — Anthony Luo
(74) *Attorney, Agent, or Firm* — David D. Brush; Westman, Champlin & Koehler, P.A.

(57) ABSTRACT

A method is provided for sending at least a first data signal and a second data signal, the data being divided into data blocks of fixed size including a header field of predetermined size, the data signals being sent to at least one data processing device adapted to apply a cyclic autocorrelation function with parameter k enabling the first and second data signals to be identified. The value of the parameter k is a function of a ratio between the size of the data blocks and the predetermined size of the header field. The method includes modifying the size of the header field of the data blocks before sending the first data signal, the value of the parameter k and the size of the data blocks remaining unchanged. A method is also provided for processing signals sent in accordance with the sending method.

9 Claims, 3 Drawing Sheets

(56) References Cited

U.S. PATENT DOCUMENTS

| | | |
|---|---|---|
| 2006/0039451 A1 | 2/2006 | Zhuang et al. |
| 2009/0086618 A1* | 4/2009 | Muschallik et al. ......... 370/208 |
| 2009/0147704 A1* | 6/2009 | Moore ......................... 370/260 |

OTHER PUBLICATIONS

Bölcskei et al.: "Blind Channel Identification and Equalization in OFDM-Based Multiantenna Systems", IEEE Transactions on Signal Processing, vol. 50, No. 1, Jan. 2002.

* cited by examiner

METHOD OF SEPARATING SOURCES IN A MULTISOURCE SYSTEM

CROSS-REFERENCE TO RELATED APPLICATIONS

This Application is a Section 371 National Stage Application of International Application No. PCT/FR2008/051362, filed Jul. 18, 2008 and published as WO 2009/016306 on Feb. 5, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of telecommunications, more specifically digital data transmission techniques such as xDSL (digital subscriber line) or radio or power line carrier communication transmission techniques. Such techniques can use single-carrier or multi-carrier modulation of the OFDM (orthogonal frequency division multiplex) or DMT (discrete multitone) type.

BACKGROUND OF THE DISCLOSURE

In the remainder of the present document, a set of emitting/receiving devices in such a network or system share the same transmission channel to communicate with one another. These devices are divided into two groups: a first group constituting a central point and a second group consisting of users. In such systems, all emitting/receiving devices of the central point receive data signals sent by all user emitting/receiving devices and vice-versa, even if those signals are not intended for them. To identify the various data signals received by a emitting/receiving device it is necessary to separate them, for example in order to determine the response of the transmission channel set up between first and second emitting/receiving devices. The response of the channel is a function representing the attenuation of the channel, for example. Access networks and local area networks are examples of such networks.

In a system such as that described above, in the downlink direction, the emitting/receiving device of a given end user receives all data signals sent by one or more emitting/receiving devices of a central node even if only one of those data signals is in fact intended for it. Similarly, in the uplink direction, a emitting/receiving device at the central node receives all data signals sent by one or more of the end user emitting/receiving devices.

A consequence of this is that the data signal received by the emitting/receiving device of an end user contains not only the data signal intended for them but also data signals sent in the same direction by other emitting/receiving devices of the central node, attenuated to a greater or lesser degree, but nevertheless perceptible, according to whether communication between the various emitting/receiving devices is by wire or wireless, e.g. radio communication. These unwanted data signals cause interference that disrupts reception of the data signal intended for the emitting/receiving device.

To correct the effects of such interference, it is necessary to know the response of the various channels of the system in the frequency or time domain.

However, it is difficult to obtain this data, especially when installing a new link or eliminating an existing link or when reinitializing the system. This difficulty stems from the fact that each emitting/receiving device at the central node and each end user emitting/receiving device receives a plurality of data signals.

It is then difficult to know the frequency response of the new link, for example, because it is impossible to identify the data signal conveyed by the new link among the plurality of data signals received.

The paper entitled "Blind Channel Identification and Equalization in OFDM-Based Multiantenna Systems", Bölcskei et al., IEEE Transactions on Signal Processing Vol. 50, No. 1, Jan. 2002, describes a method of separating data signals conveyed by the various links constituting the system. Such a method is executed in two stages: in a first stage in a emitting/receiving device acting as sender and in a second stage in a emitting/receiving device acting as receiver. This method is a blind identification method.

To separate the received data signals and thereby identify the various links constituting the system, the method described in the above paper modifies the cyclostationary periodicity of the data signals conveyed by the links of the system.

Such a blind identification method applies a precoding algorithm to the data to be sent the function of which is to modify the cyclostationary periodicity of the data signals. The precoding sequences applied to the data to be sent are different for each data signal. Thus after sending it each data signal has its own cyclostationary periodicity.

The various data signals are separated in the emitting/receiving device acting as receiver by applying a cyclic autocorrelation function. Such a function is a second order statistical function that when applied to one or more data signals causes source effects to occur that are linked to the cyclostationary periodicity of the data signals to which it is applied. By modifying the cyclostationary periodicity of the data signals, the occurrence of these source effects is controlled and it becomes possible to separate the various data signals received by a emitting/receiving device.

Although enabling efficient separation of the various data signals received, such a blind identification method has the drawback of being costly to implement.

This method requires the use of means for generating precoding sequences to be applied to the various data signals. Generating these precoding sequences requires a greater computation power and a greater storage capacity, a consequence of which is modification of the structure of the emitting/receiving devices acting as senders of the data signals. Moreover, such a method introduces a modification of the structure of the data linked to the application of the precoding sequences to the data. This modification of the structure of the data also leads to modification of the emitting/receiving device acting as receiver, which must be capable of decoding the received data in order to use it.

All these modifications lead to an increase in the cost of the equipment installed in the telecommunications network. There is therefore a need for a solution that separates the various data signals received by the same emitting/receiving device in order to correct effects linked to the phenomenon of interference and does not lead to any increase in the cost of the network equipment.

SUMMARY

An embodiment of the invention relates to a method of sending at least a first data signal and a second data signal, said data being divided into data blocks of fixed size including a header field of predetermined size, said data signals being sent to at least one data processing device adapted to apply a cyclic autocorrelation function with parameter k enabling the first and second data signals to be identified.

Such a method is noteworthy in that the value of the parameter k is a function of a ratio between the size of said data blocks and the predetermined size of the header field, and the method includes a step of modifying the size of the header field of said data blocks before sending said first data signal, the value of the parameter k and the size of said data blocks remaining unchanged.

Modifying the size of the header fields of the data blocks conveyed by one of the signals sent to the receiver device modifies the cyclostationary periodicity of the data signal. Modifying the periodic behavior of this signal enables it to be separated from the other data signals received by the receiver device for which signals the size of the header fields of the data blocks that they convey is not modified.

This header field is called a cyclic prefix. The cyclic prefix prevents overlapping of data belonging to two data blocks generated consecutively. The origin of the cyclostationary periodicity of the data signals is the fact that the cyclic prefix consists of redundant data contained in a data block.

Modifying the size of the cyclic prefix of the data blocks modifies the periodic behavior of the data signal without the data to be transmitted being either degraded or modified.

For one of the signals received by the receiver device, modifying the size of the cyclic prefix of the data blocks conveyed provides a way to control the occurrence of source effects on applying the cyclic autocorrelation function. The occurrence of these source effects is used to separate the various data signals received.

By separating the various data signals received by the receiver device in this way it is possible to simplify the processing to be applied to the data signals to correct interference noise that leads to a drop in the bit rate of the data and disturbs reception of the data by the receiver device.

Such a solution is simple to implement. The method of an embodiment of the invention requires no additional coding of the data conveyed by the data signals because it suffices to modify the size of the cyclic prefix of the data blocks to be sent. Such a method can therefore be applied to existing transmission systems already implemented in telecommunications networks.

An embodiment of the invention also relates to a method of processing data conveyed by at least two data signals, said data being divided into data blocks of fixed size including a header field of predetermined size, said method including a step of identifying at least one of said data signals by applying a cyclic autocorrelation function with parameter k of fixed value.

Such a method is noteworthy in that the value of the parameter k is a function of a ratio between the size of said data blocks and the predetermined size of the header field and the cyclic autocorrelation function is applied to data signals in which the size of the header field of the data blocks of at least one of said data signals is different from said predetermined size of the header field, the value of the parameter k and the size of the data blocks being unchanged.

To separate a plurality of received data signals, the data processing device applies a cyclic autocorrelation function. On applying the cyclic autocorrelation function, source effects linked to the periodic nature of the data signals received by the data processing device occur. By controlling the occurrence of these source effects, it is possible to separate the various data signals.

In the method of an embodiment of the invention, the occurrence of the source effects is controlled by modifying the size of the header field, or cyclic prefix, of the data blocks conveyed by at least one of the data signals received by the data processing device.

For a given data signal, it is known that if, for the data signal in question, the value of the parameter k is equal to an integer multiple of the ratio between the size of the data blocks and the size of the cyclic prefix of those data blocks, the result of applying the cyclic autocorrelation function to this data signal is a null value.

By setting the value of the parameter k to an integer multiple of the ratio between the size of the data blocks before modification and the size of the cyclic prefix before modification, the result of applying the cyclic autocorrelation function to the data signals for which the size of the cyclic prefix of the data blocks has not been modified before sending the signal is a null value. The data signal for which the result of applying the cyclic autocorrelation function is a non-null value is the data signal for which the size of the cyclic prefix of the data blocks was modified before it was sent.

According to one feature of the processing method of an embodiment of the invention, the method includes a step of eliminating said header field of said identified data signal.

In the data processing method of an embodiment of the invention the data requires no application of additional processing such as decoding linked to applying a precoding sequence to the data before sending it.

Here, once the cyclic prefix has been eliminated, the data can be processed directly.

An embodiment of the invention further relates to a device for sending at least a first data signal and a second data signal, said data being divided into data blocks of fixed size including a header field of predetermined size, said data signals being sent to at least one data processing device adapted to apply a cyclic autocorrelation function with parameter k of fixed size enabling the first and second data signals to be identified.

Such a device is noteworthy in that the value of the parameter k is a function of a ratio between the size of said data blocks and the predetermined size of the header field and moreover this sending device includes means for modifying the size of the header field of said data blocks before sending said first data signal, the value of the parameter k and the size of said data blocks remaining unchanged.

An embodiment of the invention further relates to a device for processing data conveyed by at least two data signals, said data being divided into data blocks of fixed size including a header field of predetermined size, said device including means for applying a cyclic autocorrelation function with parameter k of fixed value.

Such a device is noteworthy in that the value of the parameter k is a function of a ratio between the size of said data blocks and the predetermined size of the header field and said application means are adapted to apply said cyclic autocorrelation function to data signals in which the size of the header field of the data blocks of at least one of said data signals is different from said predetermined size of the header field, the value of the parameter k and the size of the data blocks being unchanged.

According to one feature of the data processing device of an embodiment of the invention, the device includes means for eliminating said header field in the identified data signal.

An embodiment of the invention finally relates to a composite signal including at least a first data signal and a second data signal, said composite signal being intended to be transmitted between at least one sending device and at least one data processing device interconnected by a communications network, said first and second data signals included in the composite signal conveying data divided into data blocks of fixed size including a header field of predetermined size, said receiver device being adapted to apply a cyclic autocorrelation function with parameter k of fixed value enabling said first and second data signals to be identified.

Such a signal is noteworthy in that the value of the parameter k is a function of a ratio between the size of said data blocks and the predetermined size of the header field and at least one of the first and second data signals included in said composite signal conveys data blocks in which the size of the header field is different from the predetermined size of the header field, the value of the parameter k and the size of said data blocks remaining unchanged.

BRIEF DESCRIPTION OF THE DRAWINGS

Other features and advantages become apparent on reading the description of preferred embodiments given with reference to the drawings, in which.

DETAILED DESCRIPTION OF ILLUSTRATIVE EMBODIMENTS

Figure 1A:
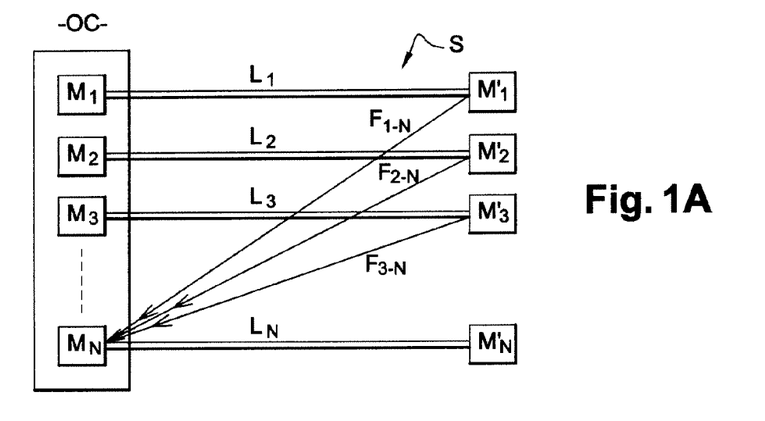
FIG. 1A represents a telecommunications system in which a new pair of modems is activated and in which the sending method of an embodiment of the invention is implemented in the telephone exchange.

FIG. 1A represents a communications system S in which the sending and data processing methods of an embodiment of the invention are used. Such a system includes a telephone central office OC including N−1 emitting/receiving devices $D_i$, $\in \{1, \ldots, N-1\}$. Such devices are xDSL modems, for example. Each modem $D_i$ in the telephone central office OC is connected by a link $L_i$ to a emitting/receiving device $D'_i$ belonging to an end user.

In a first embodiment of the invention, if the emitting/receiving devices $D_i$ in the telephone central office are xDSL modems, the emitting/receiving devices $D'_i$ are also xDSL modems. The link $L_i$ connecting the modem $D_i$ in the telephone central office to the corresponding modem $D'_i$ is an xDSL link, i.e. a link enabling transfer of data modulated by the xDSL technique. Such a link $L_i$ is a copper line that is part of a cable, for example.

In a system S such as that described with reference to FIG. 1A, each link $L_i$ conveys a signal containing data either in the uplink direction, i.e. from a modem $D'_i$ belonging to an end user to a corresponding modem $D_i$ in the telephone central office, or in the downlink direction, i.e. from a modem $D_i$ in the telephone central office to a model $D'_i$ belonging to an end user.

Figure 1B:
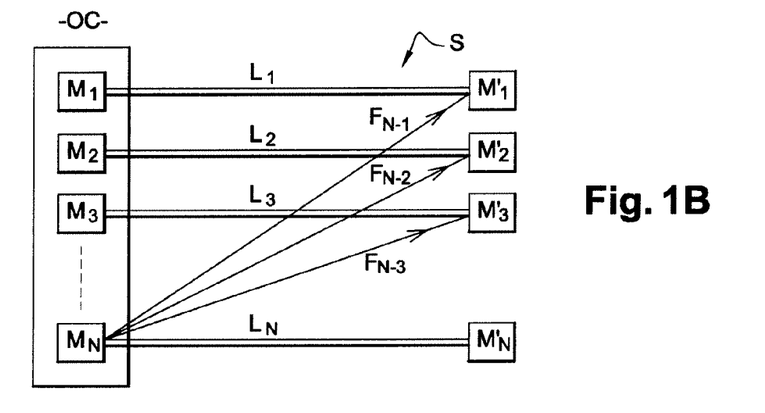
FIG. 1B represents the same telecommunications system in which the sending method of an embodiment of the invention is implemented in the N−1 emitting/receiving devices belonging to end users.

If a plurality of these data signals are transmitted in the same uplink or downlink direction, a phenomenon of electromagnetic coupling known as crosstalk occurs between the various links of the system S, causing interference. This interference is represented for the uplink direction in FIG. 1A by the various arrows $F_{i/N}$, where $F_{i/N}$ represents the interference caused by the data signal on the link i in the payload signal of the link N. For the downlink direction, the interference is represented in FIG. 1B by the various arrows $F_{N/i}$, where $F_{N/i}$ represents the interference caused by the data signal of the link N in the payload signal of the link i. The components of the system S common to the embodiment already described with reference to FIG. 1A have the same references and are not described again.

A consequence of the crosstalk phenomenon is that the data signal received by a modem $D_i$, $D'_i$ at the end of a link is a composite signal containing not only the data signal that is intended for the modem $D_i$, $D'_i$ but also data signals sent in the same direction on the other links, which are attenuated but nevertheless perceptible. Such signals are called crosstalk signals.

The presence of these crosstalk signals interferes with reception by the modems $D_i$, $D'_i$ of the data signals that are intended for them with the result that it is necessary to process the transmitted data signals to take account of the interference between the links and thus to improve transmission performance. On activating a new pair of modems $D_N$, $D'_N$ in the system S it is necessary to estimate the effects of interference between the links $L_i$ of the system S and the new link $L_N$ and the effects of interference between the new link $L_N$ and the links $L_i$ of the system S for both the downlink transmission direction and the uplink transmission direction and for each of the modems $D_N$, $D'_N$.

To be able to carry out such an estimate of the effects of interference linked to activation of the new link $L_N$, it is beneficial to isolate the signal sent by the modem $D_N$ in the telephone central office on each of the links $L_i$ and then on the link $L_N$ to isolate in the composite signal the signal sent by the various modems belonging to end users.

The same process must then be applied to the modem $D'_N$ belonging to an end user. The process applied being exactly the same, it is described only for the first of these situations.

Figure 2A:
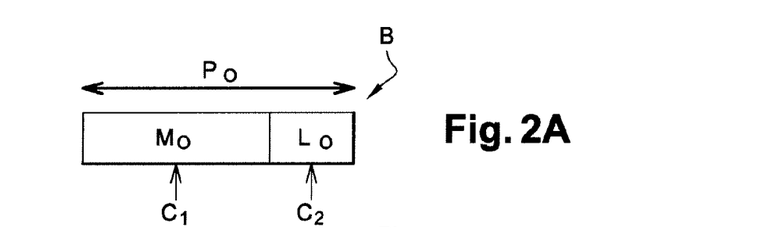
FIG. 2A represents a data block conveyed by the data signals.

Referring to FIG. 2A, data conveyed by the data signal sent by the various modems $D_i$, $D'_i$ is divided into data blocks B of size $P_0$. Each of these data blocks B includes at least two fields $C_1$ and $C_2$. The field $C_1$ contains the data to be sent and is of size $M_0$. The field $C_2$, of size $L_0$, contains a copy of the last $L_0$ data items in the field $C_1$. The field $C_2$ prevents interference between two data blocks B sent successively. This field $C_2$ is a cyclic prefix.

Figure 3:
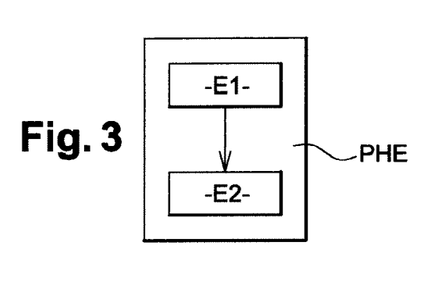
FIG. 3 represents the steps of the sending method of an embodiment of the invention.

The sending method of an embodiment of the invention, the steps of which are represented in FIG. 3, is implemented in the downlink direction by the modem $D_N$ in the telephone central office OC.

During a first step E1, the size of the fields $C_1$ and $C_2$ of the data blocks conveyed by the data signal sent by the modem $D_N$ is modified whereas the size $P_0$ of the data blocks remains exactly the same. In such a data block B', represented in FIG. 2B, the field $C_1$ of size $M_1$ contains the data to be sent and the field $C_{21}$ contains a copy of part of the data to be sent. The step of modifying the size of these fields of the data blocks B' entails modifying the size of the fields $C_2$ and $C_1$ of each of the data blocks B' to be sent without modifying the size $P_0$ of the data blocks B'.

Figure 2B:
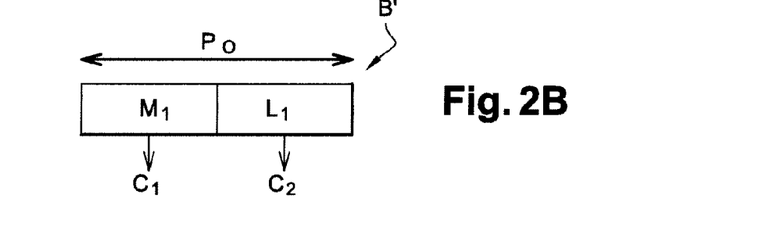
FIG. 2B represents a data block in which the size of the fields constituting it has been modified before sending.

Thus the field $C_2$ of a data block B' has a size $L_1$ different from the size $L_0$ of the field $C_2$ of the data blocks B, whereas the data blocks B conveyed by data signals sent by the N−1 other modems $D_i$ in the telephone central office OC have the same size $P_0$ as the data blocks B'.

The cyclostationary periodicity is a second order statistical property of data signals conveyed in systems using DMT or OFDM transmission or any other transmission method employing a cyclic prefix. This property of the data signals is a result of the fact that the cyclic prefix $C_2$ contains a copy of part of the data contained in the data field $C_1$ of the data blocks conveyed by the data signals.

Modifying the size of the cyclic prefix $C_2$ of the data blocks B' modifies the cyclostationary periodicity of the data signal sent by the new model $D_N$ because a distinct quantity of data is redundant.

During a step E2, the modem $D_N$ sends a data signal conveying the data blocks B'.

The combination of the steps E1 and E2 of the sending method of an embodiment of the invention constitutes a sending phase PHE.

Figure 4:
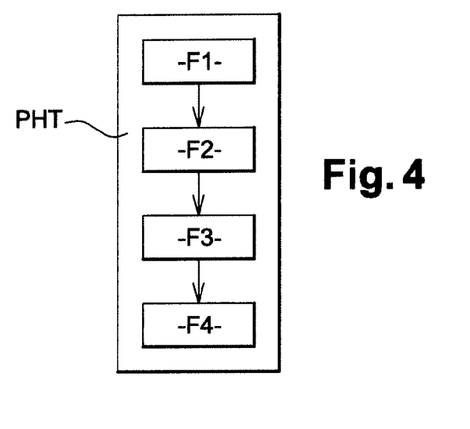
FIG. 4 represents the steps of the data processing method of an embodiment of the invention.

The data processing method of an embodiment of the invention, the steps of which are represented in FIG. 4, is implemented in the downlink direction by each modem $D'_i$ belonging to an end user.

During a first step F1 the modem $D'_i$ receives a composite signal including the data signals sent by the N−1 modems $D_i$ in the telephone central office OC and by the modem $D_N$.

During a second step F2 a cyclic autocorrelation function r is applied to the received composite signal. Such a cyclic autocorrelation function has the expression:

$$r_y(k, \tau) = \frac{1}{P_0} \sum_{n=0}^{P_0-1} R_y(n, \tau) e^{-\frac{j2\pi k}{P_0}n}$$

in which $R_y$ represents the autocorrelation function of the signal received by the modem $D'_i$, k is a natural integer, τ is a real number, and $P_0$ is the size of the data blocks B and B'.

The cyclic autocorrelation function $r_y$ (k, τ) is the $k^{th}$ coefficient of the Fourier series expansion of the autocorrelation function $R_y$(n, τ)=E{y(n)y(n−τ)*}, where E{ } represents the mathematical esperance.

The properties of the cyclic autocorrelation function $r_y$ are such that, when it is applied to one or more data signals, it causes their cyclostationary periodicity to become apparent. Causing cyclostationary behavior of a stack of data signals to which the cyclic autocorrelation function is applied makes it possible to identify one or more of them.

In the data processing method of an embodiment of the invention, the parameter k is chosen so that:

$k=NP_0/L_0$ (1)

where N is a natural integer.

When the cyclic autocorrelation function r with these parameter values is applied to the received composite signal, it identifies the data signal sent by the modem $D_N$.

When the cyclic autocorrelation function $r_y$ is applied to a data signal in which the size of the data blocks that it conveys has the value $P_0$ and the size of the cyclic prefix has the value $L_0$, the result of this application is a null value for k satisfying relation (1), the function is referred to as extinguished.

When the cyclic autocorrelation function with parameters set in this way is applied to a data signal in which the size of the cyclic prefix that it conveys is different from $L_0$ for the same values of $P_0$ and k, the result of applying the function r is a non-null value.

Accordingly, when the value of the parameter k satisfies relation (1), the cyclic autocorrelation function r is applied to the composite signal received by the modem $D'_i$ belonging to an end user, the only data signal for which the result of applying the cyclic autocorrelation function r is a non-null value is the data signal sent by the new modem $D_N$ and for which the size of the data blocks that it conveys has been modified during the step E1 of the sending method of an embodiment of the invention.

The principle used to identify the various data signals constituting the composite signal received by the modem acting as receiver is to control the occurrence of source effects on applying the cyclic autocorrelation function. To control the occurrence of source effects, the inventors of the present patent application propose to modify the cyclostationary behavior of the data signal or signals to be identified by modifying the size of the cyclic prefixes conveyed by the data signal or signals before sending it or them so that the size of the cyclic prefixes of the data blocks B' is different from the size of the cyclic prefixes of the data blocks B conveyed by the other data signals.

After the step F2, it is possible to estimate the response of the channel conveying the data signal identified in this way.

Once the data signal sent by the modem $D_N$ has been identified, during a step F3 of the data processing method the cyclic prefix $C_2$ of each data block B' is eliminated.

Once the cyclic prefix $C_2$ has been eliminated, the data contained in the data field $C_1$ of each of the data blocks B' is processed.

The combination of the steps F1 to F4 of the data processing method of an embodiment of the invention constitutes a processing phase PHT.

To estimate the effects of interference in the uplink direction, it is necessary to isolate in the composite signal received by the modem $D_N$ in the telephone central office OC the signal sent by the N−1 modems $D'_i$ belonging to end users.

To this end, each modem $D'_i$ belonging to an end user implements the sending phase PHE.

When a modem $D'_i$ implements the sending phase PHE, the modem $D_N$ at the telephone central office OC executes the data processing phase PHT.

This process continues until the N−1 modems $D'_i$ have executed the sending phase PHE.

Figure 7:
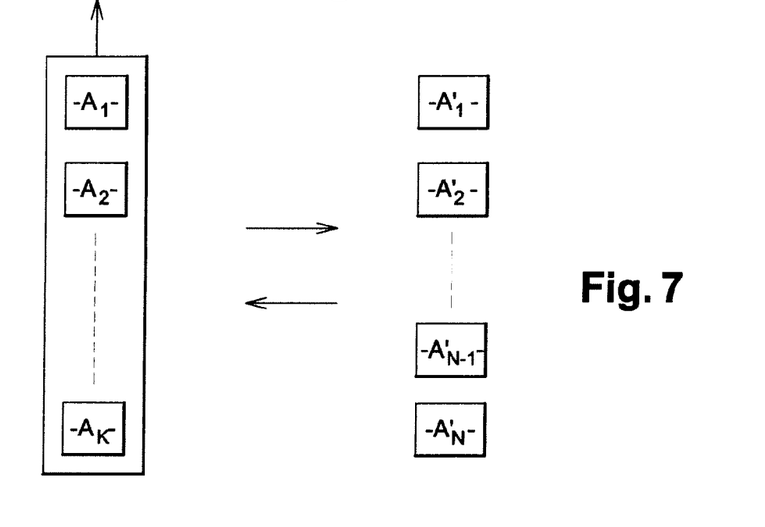
FIG. 7 represents a telecommunications system in which a new antenna is activated and in which the solution of an embodiment of the invention is implemented.

In another embodiment of the invention, represented in FIG. 7, the emitting/receiving devices are radio antennas $A_i$, $A'_j$ that share the same transmission channel to communicate with each other. In such an embodiment, the data transmitted is modulated using the OFDM technique or a modulation technique known as single-carrier modulation using a cyclic prefix.

Such a system includes a central node CP with K antennas $A_i$, i∈{1, . . . , K}. Each of the N−1 end users has an antenna $A'_i$ i∈{1, . . . , N−1}, K≠N. When activating a new user N in the system S of the antenna $A'_N$, it is necessary to estimate the transmission channel providing communication between the various antennas $A_i$ of the system S and the new antenna $A'_N$ in both the downlink transmission direction and the uplink transmission direction for each of the antennas A, located at the central point and the antenna $A'_N$ of the user N.

In such a system, each antenna $A_i$ at the central point receives data signals sent by all the antennas $A'_j$ of the end users, and vice-versa, even if those signals are not intended for it.

The sending method of an embodiment of the invention is used to identify at the central point the uplink data signals sent by the antenna $A'_N$ of the user N.

For the uplink direction, the data processing method of an embodiment of the invention is executed by each antenna $A'_i$ located at the central point.

To estimate the effects of interference in the downlink direction, it is necessary to isolate in the composite signal received by the antenna $A'_N$ of the user N the signal sent by the K antennas $A_i$ located at the central point.

To this end, each antenna A, located at the central point executes the sending phase PHE.

When an antenna $A_i$ executes the sending phase PHE, the antenna $A'_N$ of the user N executes the data processing phase PHT.

This process continues until the K antennas A, have executed the sending phase PHE.

Figure 5A:
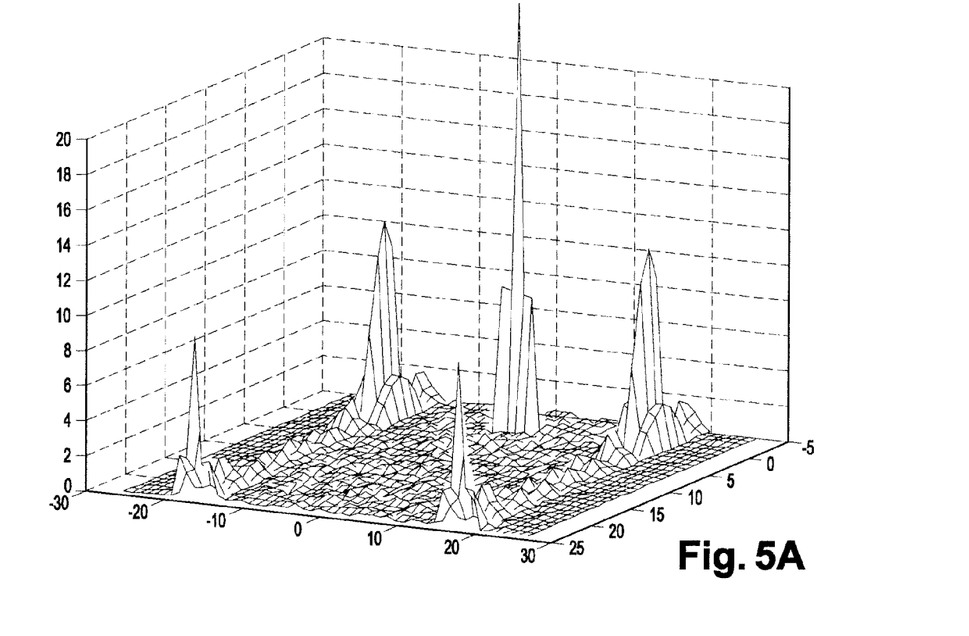
FIG. 5A is a graphical representation of a cyclic autocorrelation function applied to a data signal for which the ratio M/L is not a multiple of 5.

FIG. 5A represents application of the cyclic autocorrelation function $r_y$ to a data signal. The size $P_0$ of the data blocks B conveyed by this data signal has the value 25 and the field $C_2$ of this data block has a size $L_0$ equal to 8.

Here, for a value of the parameter k of the cyclic autocorrelation function $r_y$ equal to 5, the result of applying the cyclic autocorrelation function to this data signal is a non-null value, as k is not a multiple of the ratio $P_0/L_0$. It is then possible to identify the data signal.

Figure 5B:
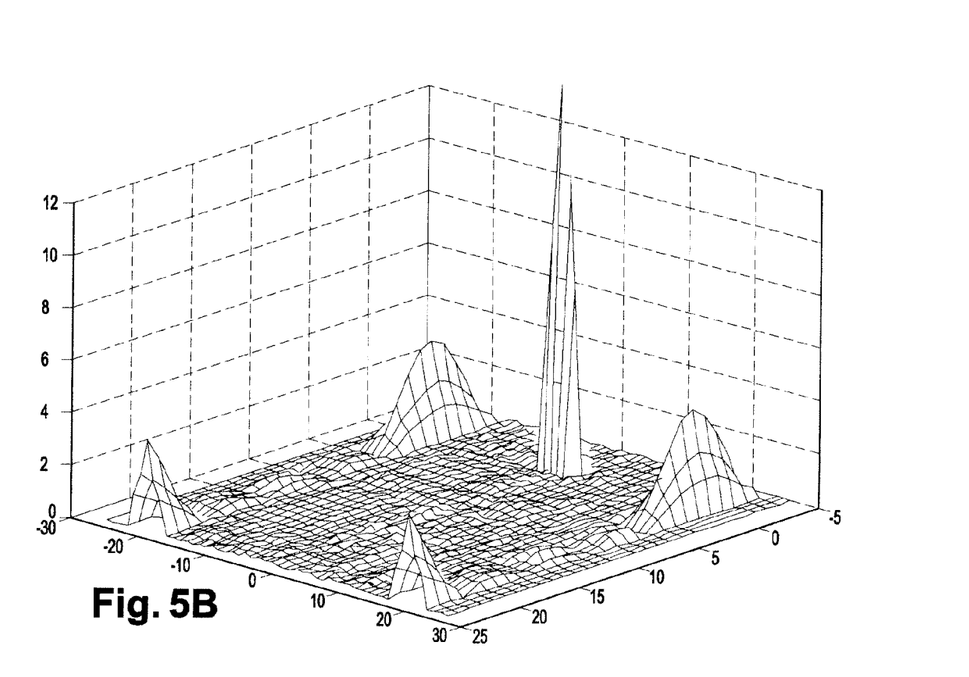
FIG. 5B is a graphical representation of a cyclic autocorrelation function applied to a data signal for which the ratio M/L is a multiple.

FIG. 5B represents application of the cyclic autocorrelation function r to another data signal. The size $P_1$ of the data block B' conveyed by the data signal has the value 25, the field $C_2$ being of size L1 equal to 5.

Here, the value of the parameter k of the cyclic autocorrelation function $r_y$ remains the same and is equal to 5. In this example, the value of k is a multiple of the ratio $P_0/L_0$, the result of applying the cyclic autocorrelation function to the data signal is a null value, and the result of applying the cyclic autocorrelation function to the data signal described with reference to FIG. 5A is a non-null result because the value of k is not a multiple of the ratio $P_1/L_1$.

It is then possible to identify which of the two data signals received is the first data signal, the cyclic autocorrelation function of which is represented in FIG. 5A.

Figure 6:
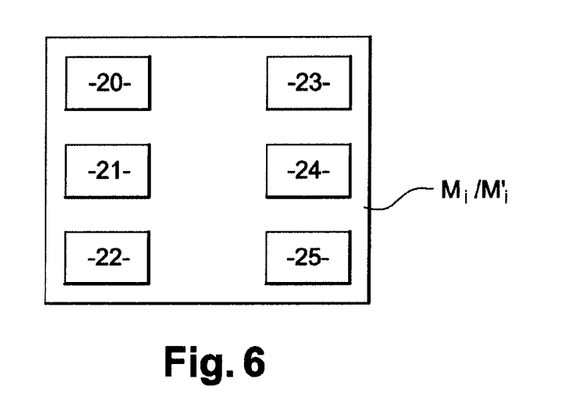
FIG. 6 represents a emitting/receiving device adapted to implement the sending and data processing methods of an embodiment of the invention.

FIG. 6 represents a emitting/receiving device $M_i$, $M'_i$ in which the sending and data processing methods of an embodiment of the invention are used.

Such a emitting/receiving device $M_i$, $M'_i$ includes, for executing the sending method, means 20 for modifying the size of the data blocks conveyed by the data signal to be sent and means 21 for sending the data signal.

To use the data processing method, the emitting/receiving device $M_i$, $M'_i$ includes means 22 for receiving a composite signal, means 23 for applying a cyclic autocorrelation function r, means 24 for eliminating the cyclic prefix $C_2$ of the data blocks conveyed by the data signal identified by applying the cyclic autocorrelation function r, and finally data processing means 25.

Finally, an embodiment of the invention further provides a computer program, in particular a computer program on or in an information medium or memory, adapted to implement an embodiment of the invention. This program can use any programming language and take the form of source code, object code or a code intermediate between source code and object code, such as a partially compiled form, or any other form desirable for implementing a method of an embodiment of the invention.

The information medium can be any entity or device capable of storing the program. For example, the medium can include storage means, such as a ROM, for example a CD ROM or a micro-electronic circuit ROM, or magnetic storage means, for example a floppy disk or a hard disk.

Moreover, the information medium can be a transmissible medium such as an electrical or optical signal, which can be routed via an electrical or optical cable, by radio or by other means. The program of an embodiment of the invention can in particular be downloaded over an Internet-type network.

An embodiment of the invention addresses a need for a solution that separates the various data signals received by the same emitting/receiving device in order to correct effects linked to the phenomenon of interference and does not lead to any increase in the cost of the network equipment.

Although the present disclosure has been described with reference to one or more examples, workers skilled in the art will recognize that changes may be made in form and detail without departing from the scope of the disclosure and/or the appended claims.

The invention claimed is:

1. A method of sending data performed by a sending device and comprising:

sending data by at least a first data signal and a second data signal, said data being divided into data blocks of identical size including a header field, which is a cyclic prefix and has a predetermined size, said data signals being sent to at least one data processing device adapted to apply a cyclic autocorrelation function with parameter k to the data blocks of the first and second data signals enabling said first and second data signals to be identified, wherein the value of the parameter k is a natural integer and is a multiple of a ratio between the size of said data blocks and the predetermined size of the header field; and if said first data signal needs to be separated from said second data signal, modifying the size of the header field of the data blocks of said first data signal before sending said first data signal, so that the size of the header field of the data blocks of said first data signal is different from said predetermined size of the header field of the data blocks of said second data signal, the value of the parameter k and the size of said data blocks remaining unchanged.

2. A method of processing data conveyed by at least two data signals by a data processing device, the method comprising:

receiving the at least two data signals, said data being divided into data blocks of identical size including a header field, which is a cyclic prefix and has a predetermined size, the header field of one of said data signals being different in size from the predetermined size of the header field of the other said data signal;

applying a cyclic autocorrelation function with parameter k of fixed value to the data blocks of said data signals, wherein the value of the parameter k is a natural integer and a multiple of a ratio between the size of said data blocks and the predetermined size of the header field; and if applying the cyclic autocorrelation function yields a non-null result, identifying said one of said data signals in which the size of the header field of the data blocks is different from said predetermined size of the header field, the value of the parameter k and the size of the data blocks remaining unchanged.

3. The method according to claim 2, including a step of eliminating said header field of said identified data signal.

4. A device comprising:
a non-transitory memory comprising a computer program stored thereon; and
a computer, which is configured by the computer program to execute the following steps:
sending data by at least a first data signal and a second data signal, said data being divided into data blocks of identical size including a header field, which is a cyclic prefix and has a predetermined size, said data signals being sent to at least one data processing device adapted to apply a cyclic autocorrelation function with parameter k of fixed value to the data blocks of the first and second data signals enabling said first and second data signals to be identified, wherein the value of the parameter k is a natural integer and a multiple of a ratio between the size of said data blocks and the predetermined size of the header field; and
if said first data signal needs to be separated from said second data signal, modifying the size of the header field of the data blocks of said first data signal before sending said first data signal, so that the size of the header field of the data blocks of said first data signal is different from said predetermined size of the header field of the data blocks of said second data signal, the value of the parameter k and the size of said data blocks remaining unchanged.

5. A device for processing data conveyed by at least two data signals, said data being divided into data blocks of identical size including a header field, which is a cyclic prefix and has a predetermined size, said device including:
a non-transitory memory comprising a computer program stored thereon; and
a computer, which is configured by the computer program to execute the following steps:
receiving the at least two data signals, the header field of one of said data signals being different in size from the predetermined size of the header field of the other said data signal;
applying a cyclic autocorrelation function with parameter k of fixed value to the data blocks of said data signals, wherein the value of the parameter k is a natural integer and a multiple of a ratio between the size of said data blocks and the predetermined size of the header field; and
if applying the cyclic autocorrelation function yields a non-null result, identifying said one of said data signals in which the size of the header field of the data blocks is different from said predetermined size of the header field, the value of the parameter k and the size of the data blocks being unchanged.

6. The device according to claim 5, wherein the data blocks include a first field containing said data and at least one second field, the size of the data blocks of the identified data signal differs from the size of the data blocks predetermined by the size of the second field that is different, and the device is configured to eliminate said second field in the identified data signal.

7. A system comprising:
at least one sending device configured to send data by at least a first data signal and a second data signal, said data being divided into data blocks of identical size including a header field, which is a cyclic prefix and has a predetermined size, and comprising:
a first non-transitory memory comprising a first computer program stored thereon; and
a first computer, which is configured by the first computer program to execute the following steps:
modifying the size of the header field of the data blocks of said first data signal, if said first data signal needs to be separated from said second data signal, before sending said first data signal, so that the size of the header field of the data blocks of said first data signal is different from said predetermined size of the header field of the data blocks of said second data signal, a value of a parameter k and the size of said data blocks remaining unchanged; and
at least one processing device for processing the data conveyed from the at least one sending device by at least the first data signal and the second data signal, said processing device comprising:
a second non-transitory memory comprising a second computer program stored thereon; and
a second computer, which is configured by the second computer program to execute the following steps:
applying a cyclic autocorrelation function with the parameter k of fixed value to the data blocks of the first data signal and the second data signal, wherein the value of the parameter k is a natural integer and a multiple of a ratio between the size of said data blocks and the predetermined size of the header field; and
if applying the cyclic autocorrelation function yields a non-null result, identifying said one of said data signals in which the size of the header field of the data blocks is different from said predetermined size of the header field.

8. A non-transitory computer-readable medium comprising a computer program product stored thereon, wherein the product includes program code instructions for executing a method of sending data when said program is executed by a computer, wherein the method comprises:
sending the data by at least a first data signal and a second data signal, said data being divided into data blocks of identical size including a header field, which is a cyclic prefix and has a predetermined size, said data signals being sent to at least one data processing device adapted to apply a cyclic autocorrelation function with parameter k to the data blocks of the first and second data signals enabling said first and second data signals to be identified, wherein the value of the parameter k is a natural integer and a multiple of a ratio between the size of said data blocks and the predetermined size of the header field; and
if said first data signal needs to be separated from said second data signal, modifying the size of the header field of the data blocks of said first data signal before sending said first data signal, so that the size of the header field of the data blocks of said first data signal is different from said predetermined size of the header field of the data blocks of said second data signal, the value of the parameter k and the size of said data blocks remaining unchanged.

9. A non-transitory computer-readable medium comprising a computer program product stored thereon, wherein the product includes program code instructions for executing a method of processing data when said program is executed by a computer, wherein the method comprises:
processing data conveyed by at least two data signals, said data being divided into data blocks of identical size including a header field, which is a cyclic prefix and has a predetermined size, the header field of one of said data signals being different in size from the predetermined size of the header field of the other said data signal; and applying a cyclic autocorrelation function with parameter k of fixed value to the data blocks of said data signals, wherein the value of the parameter k is a natural integer and a multiple of a ratio between the size of said data blocks and the predetermined size of the header field; and if applying the cyclic autocorrelation function yields a non-null result, identifying said one of said data signals in which the size of the header field of the data blocks is different from said predetermined size of the header field, the value of the parameter k and the size of the data blocks remaining unchanged.

* * * * *